Patented Aug. 3, 1954

2,685,552

UNITED STATES PATENT OFFICE 2,685,552

DIMETHYL 1-CARBOMETHOXY-1-PROPEN-2-yl PHOSPHATE

Alan R. Stiles, Berkeley, Calif., assignor to Shell Development Company, Emeryville, Calif., a corporation of Delaware No Drawing. Application February 29, 1952, Serial No. 274,288

7 Claims. (Cl. 167—22)

This invention relates to the provision of a novel phosphorus-containing compound and to the provision of insecticidal compositions containing the same.

I have discovered a novel compound, dimethyl 1-carbomethoxy-1-propen-2-yl phosphate, which has been found to possess outstanding insecticidal properties when employed as either a contact or a systemic insecticide. Further, the compound has the added advantage of exhibiting a relatively low mammalian toxicity.

The novel compound of the present invention can be prepared by any of the methods known in the art for synthesizing compounds of this same general character. One convenient way of preparing the compound is to react trimethyl phosphite with methyl α-chloroacetoacetate, the reaction proceeding in accordance with the following equation:

$$CH_3CO.CHClCOOCH_3 + (CH_3O)_3P \longrightarrow$$

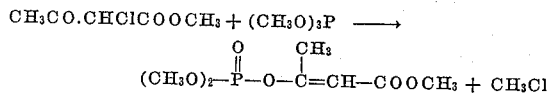

The foregoing method of preparation is that which was employed in the following example.

EXAMPLE I

In this operation 100 grams of trimethyl phosphite was added dropwise to 121.5 grams of methyl α-chloroacetoacetate over the course of a one hour reaction period during which the temperature rose gradually from room temperature to about 85° C. The resulting reaction mixture was then distilled in vacuo, there being recovered, as the fraction boiling between 106 and 107.5° C. at 1 mm. Hg, 123 grams of a liquid product identified as dimethyl 1-carbomethoxy-1-propen-2-yl phosphate. This compound, which has a refractive index ($n\ 20/D$) of 1.4494 and a density ($D\ 20/4$) of 1.25, was found to have the following composition:

|  | Found | Calculated |
|---|---|---|
| Percent C | 39.8 | 37.5 |
| Percent H | 6.6 | 5.8 |
| Percent P | 13.9 | 13.83 |

As indicated above, the compound dimethyl 1-carbomethoxy-1-propen-2-yl phosphate has been found to be highly toxic to insects, a term which is employed herein to include not only the members of the class Insecta, but also related or similar non-vertebrate animal organisms belonging to the allied classes of arthropods and including mites, ticks, spiders, wood lice, and the like.

The compound of this invention can be employed for insecticidal purposes by the use of any of the methods which are conventionally employed in that art. For example, the compound can either be sprayed or otherwise applied in the form of a solution or dispersion, or it can be absorbed on an inert, finely divided solid and applied as a dust. Useful solutions for application by spraying, brushing, dipping, and the like, can be prepared by using as the solvent any of the well-known inert horticultural carriers, including neutral hydrocarbons such as kerosene and other light mineral oil distillates of intermediate viscosity and volatility. Adjuvants, such as spreading or wetting agents, can also be included in the solutions, representative materials of this character being fatty acid soaps, rosin salts, saponins, gelatin, casein, long chain fatty alcohols, alkyl aryl sulfonates, long-chain alkyl sulfonates, phenol-ethylene oxide condensates, $C_{12}$ to $C_{20}$ amines and ammonium salts, and the like. These solutions can be employed as such, or, more preferably, they can be dispersed or emulsified in water and the resulting aqueous dispersion or emulsion applied as a spray. Solid carrier materials which can be employed include talc, bentonite, lime, gypsum, pyrophyllite and similar inert solid diluents. If desired, the compound of the present invention can be employed as an aerosol, as by dispersing the same into the atmosphere by means of a compressed gas.

As indicated above, the compound dimethyl 1-carbomethoxy-1-propen-2-yl phosphate is not only effective as a contact poison, but it is also extremely toxic when used as a systemic poison. In the latter case the compound, either with or without a suitable carrier or diluent, can be applied to the soil in the vicinity of the growing plant to be protected (with the compound then being absorbed from the soil by the plant) or it can be applied directly to the plant where it is again distributed throughout the plant tissues. In either case the plant as a whole then becomes toxic to insects which consume any portion thereof.

The concentration of dimethyl 1-carbomethoxy-1-propen-2-yl phosphate to be used with the above carriers is dependent upon many factors, including the particular carrier employed, the method and conditions of application, and the insecticide species to be controlled, and a proper consideration and resolution of these factors is within the skill of those versed in the insecticide art. In general, however, the compound of this invention is effective in concentrations of from about 0.01 to 0.5% based upon the total weight of the composition, though under some circumstances as little as about 0.00001% or as much as 2% or even more of the compound can be employed with good results from an insecticidal standpoint.

When employed as an insecticide, the compound of this invention can be employed either as the sole toxic ingredient of the insecticidal composition or it can be employed in conjunction with other insecticidally-active materials. Representative insecticides of this latter class include the naturally-occurring insecticides such as pyrethrum, rotenone, sabadilla, and the like, as well as the various synthetic insecticides, including DDT, benzene hexachloride, thiodiphenylamine, cyanides, tetraethyl pyrophosphate, O,O-diethyl-O-p-nitrophenyl thiophosphate, azobenzene, and the various compounds of arsenic, lead, and/or fluorine.

In the following examples the insecticidal qualities of the dimethyl 1-carbomethoxy-1-propen-2-yl phosphate compound are clearly demonstrated, with a comparison being made in each case between the insecticidal toxicity of the said compound and that of other more or less closely related compounds.

EXAMPLE II

The LD$_{50}$ values for dimethyl 1-carbomethoxy-1-propen-2-yl phosphate and the other compounds named in Table I below were determined by spraying a solution of the insecticide, in a neutral petroleum distillate boiling within the kerosene range, on plants infected with 2-spotted mite (*Tetranychus bimaculatus*), pea aphid (*Illinoia pisi*) and the house fly (*Musca domestica*). The LD$_{50}$ values given in the table represent the concentration of the toxic agent in the solvent at which, under standard test conditions, a 50% mortality of the insects in each test was observed.

Table I

| Toxic Agent | LD$_{50}$ | | |
|---|---|---|---|
| | 2-spotted mite | pea aphid | housefly |
| Dimethyl 1-carbomethoxy-1-propen-2-yl phosphate | 0.008 | 0.002 | 0.008 |
| Dimethyl 1-carbethoxy-1-propen-2-yl phosphate | 0.015 | 0.008 | 0.017 |
| Diethyl 1-carbethoxy-1-propen-2-yl phosphate | 0.03 | 0.007 | 0.009 |
| Diethyl 1-carbethoxy-1-chloro-1-propen-2-yl phosphate | 0.11 | 0.02 | 0.012 |
| Diethyl 1-carbobutoxy-1-propen-2-yl phosphate | 0.015 | 0.005 | 0.014 |

EXAMPLE III

This example illustrates the systemic action of dimethyl 1-carbomethoxy-1-propen-2-yl phosphate and that of related insecticides. The tests were carried out by diluting with water a 1% solution in acetone of each of the insecticides until solutions of the desired text strength were obtained. Young growing pinto bean plants infested with 2-spotted mites were carefully removed from the soil, after which their roots were washed with water and carefully immersed in the test solutions contained in glass flasks, the flasks then being stoppered with cotton around the stem of the plant. In the following table there is shown the concentration of the active agent in each test solution required to kill 50% of the mites on the infected plant within a 48 hour period following immersion of the roots in the solution.

Table II

| Active Agent | Concentration, p. p. m., for LD$_{50}$ |
|---|---|
| Dimethyl 1-carbomethoxy-1-propen-2-yl phosphate | 0.75. |
| Dimethyl 1-carbethoxy-1-propen-2-yl phosphate | 3. |
| Diethyl 1-carbethoxy-1-propen-2-yl phosphate | 25–50. |
| Diethyl 1-carbethoxy-1-chloro-1-propen-2-yl phosphate | over 200. |
| Diethyl 1-carbobutoxy-1-propen-2-yl phosphate | over 200. |

The invention claimed is:

1. Dimethyl 1-carbomethoxy-1-propen-2-yl phospate.

2. An insecticidal composition comprising a mixture incorporating dimethyl 1-carbomethoxy-1-propen-2-yl phosphate as an active ingredient.

3. An insecticidal composition comprising an inert carrier material and as an active ingredient dimethyl 1-carbomethoxy-1-propen-2-yl phosphate.

4. An insecticidal composition comprising an inert solvent and dimethyl 1-carbomethoxy-1-propen-2-yl phosphate.

5. An insecticidal composition comprising a neutral hydrocarbon solvent and as an active ingredient, dimethyl 1-carbomethoxy-1-propen-2-yl phosphate.

6. The method of combating insects which comprises subjecting said insects to the action of dimethyl 1-carbomethoxy-1-propen-2-yl phosphate.

7. The method of protecting a living plant against attack by insects which comprises placing dimethyl 1-carbomethoxy-1-propen-2-yl phosphate in a position to permit absorption thereof by the living plant.

References Cited in the file of this patent

B. I. O. S. report PB 87923–R, released April 23, 1948, page 33.